United States Patent [19]
Teraishi

[11] 3,955,190
[45] May 4, 1976

[54] ELECTRO-OPTICAL DIGITAL DISPLAY
[75] Inventor: Katsuhiro Teraishi, Suwa, Japan
[73] Assignee: Kabushiki Kaisha Suwa Seikosha, Tokyo, Japan
[22] Filed: Sept. 11, 1973
[21] Appl. No.: 396,341

[30] Foreign Application Priority Data
Sept. 11, 1972 Japan.................. 47-90352

[52] U.S. Cl.................. 340/336; 58/50 R; 350/150; 350/160 P
[51] Int. Cl.²............................................. G06F 3/14
[58] Field of Search............ 350/150, 157, 160 LC, 350/160 P; 340/324 M, 324 R, 336; 58/50, 23

[56] References Cited
UNITED STATES PATENTS

| | | | |
|---|---|---|---|
| 3,499,112 | 3/1970 | Heilmeier et al. | 350/160 LC |
| 3,505,804 | 4/1970 | Hofstein | 340/336 |
| 3,531,182 | 9/1970 | Land et al. | 350/157 |
| 3,541,543 | 11/1970 | Crawford et al. | 340/336 |
| 3,555,987 | 1/1971 | Browning | 350/150 |
| 3,666,666 | 5/1972 | Haertling | 350/150 |
| 3,799,647 | 3/1974 | Luft | 350/150 |

OTHER PUBLICATIONS
Ferroelectric Electrooptic Ceramics with Reduced Scattering Thatcher et al.; IEEE Trans. Vol. ED-16; No. 6; June 1969, pp. 517-21.
Ferroelectric Ceramic Electrooptic Materials and Devices; Land et al., Proc. IEEE (May 1969), Vol. 57, pp. 751-768.
Ferroelectric Ceramic Light Gates Operated in a Voltage Controlled Mode Maldonado et al., IEEE Trans; Vol. ED-17, No. 2; Feb. 1970, pp. 148-157.
Strain-Biased PLZT Input Devices for Holographic Memories and Optical Data Processing; Roberts; Applied Optics, Vol. 11, No. 2, Feb. 1972, pp. 397-404.

*Primary Examiner*—Marshall M. Curtis
*Attorney, Agent, or Firm*—Blum, Moscovitz, Friedman & Kaplan

[57] ABSTRACT

An electro-optical digital display particularly suited for use in an electronic wristwatch is provided. The display includes a transparent ceramic material formed as a plate having a pair of opposed major surfaces. Circuitry selectively applying an electric field to the ceramic material, the circuitry including a first transparent electrode engaging a first major surface of the plate and a second reflective electrode adapted to reflect light incident thereon provided from the second major surface of the plate. The first transparent electrode is segmented to define selected regions of application of an electric field to the selective regions of a ceramic plate. A polarization device for circular polarization is disposed adjacent the transparent electrode in the path of incident light upon the transparent electrode, incident light being reflected at selected regions by the reflective electrode in response to the selective energization of the segmented and reflective electrodes, the plate appearing opaque to incident light in the absence of such selective energization.

7 Claims, 18 Drawing Figures

ELECTRO-OPTICAL DIGITAL DISPLAY

BACKGROUND OF THE INVENTION

This invention relates generally to an improved electro-optical display and particularly to an improved electro-optical display for use in solid state electronic timepieces. As the popularity of solid state electronic timepieces such as wrist watches has increased, so has the popularity of digital displays. Such digital displays have been comprised of light emitting diodes or liquid crystal cells.

Because the size of a battery which can be included in a wrist watch is extremely small, the use of such batteries to supply the energy required to light up displays formed from light emitting diodes has been less than completely satisfactory. Because light emitting diodes require a considerable amount of power it has been the practice to provide a manual switch which lights up the light emitting diode display only at the time that the wearer of the wrist watch desires to know the time.

Similarly, although liquid crystal display cells require considerably less power than light emitting diodes such liquid crystal display cells can on the average be maintained for perhaps a little more than a year in a constantly lightened state. High precision electronic wrist watches having quartz crystal oscillators as a time standard have gained recognition because of the long period of time over which they remain accurate without the necessity of making adjustments thereto. The time period over which liquid crystal display elements remain reliable in comparison to that of such electronic wrist watches is considerably shorter. Because the liquid crystal cells have a significantly shorter operating life than the quartz crystal oscillator the effective life of the timepiece is limited by the life of the display cells, thus decreasing the effective market value of such digital display wrist watches.

Finally, a further attempt to provide long lasting optical display elements has been the use of single crystals such as a GMO. A single crystal requires sophisticated manufacturing techniques and must be processed giving consideration to the crystal axis as an optical element. Accordingly, the cost of producing such single crystal elements is high, as is the cost of such materials required in the manufacturing process. Moreover, because optional elements cannot be added to the single crystal, the improvement of the physical characteristics thereof is rendered difficult.

SUMMARY OF THE INVENTION

Generally speaking, in accordance with the invention a display cell formed of ceramic sintered material provides a display having high reliability, long life and can be continuously lighted with minimal power consumption. The electro-optical display cell is comprised of a special transparent sintered ceramic material and is utilized in combination with electro-optical display members such as polarizers and electrodes to effect such display. Such display elements becuase of their solid state reliability and minimal power consumption during use, are particularly suited for small sized electronic timepieces such as wrist watches wherein the necessity for providing a small sized limited capacity battery is present.

Accordingly, it is an object of this invention to provide an improved electro-optical display formed of transparent ferroelectric ceramic cells.

Another object of the invention is to provide an improved electro-optical display capable of providing long life, and low power consumption in an electronic timepiece.

Still another object of the invention is to provide an improved electro-optical display cell comprised of passive materials and a polarizing optical system in which the retardation of the cell is varied in response to a potential applied thereto.

Still another object of the invention is to provide a display cell that is equally effective with either a linear or circular polarizing system, or a cross nicol or parallel nicol polarizing system.

Still other objects and advantages of the invention will in part be obvious and will in part be apparent from the specification and drawings.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
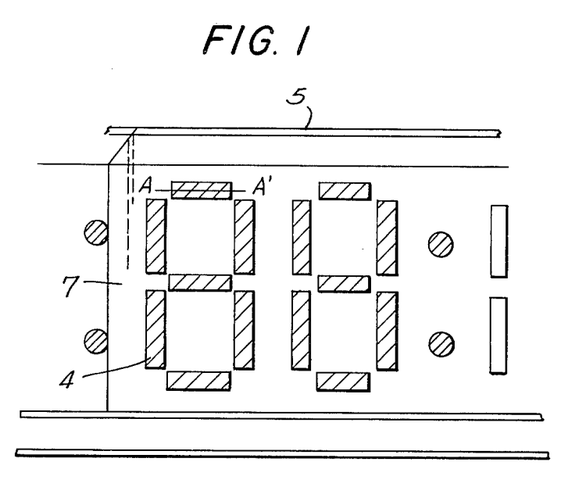
FIG. 1 is a perspective view of a segmented display constructed in accordance with an embodiment of the instant invention.
Figure 2:
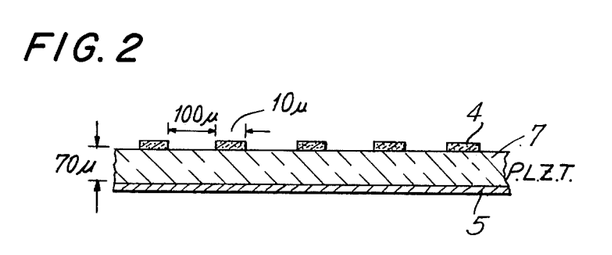
FIG. 2 is a sectional view taken along line A-A' of FIG. 1.
Figure 3:
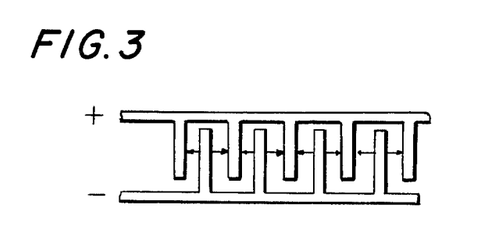
FIG. 3 is a plan view of the transparent electrodes of FIG. 2.

Referring now to FIGS. 1, 2 and 3, a display element of an electro-optical paraelectric display in accordance with the invention is depicted. The display element is formed of plate 7 formed of a transparent sintered material having the following general formula:

$$Pb_{(1-3/2\,x)}La_x(Zr_yTi_z)O_3$$

hereinafter referred to as "PLZT".

An electro-optical effect is produced by applying the voltage to the above sintered material. The change of the double refraction i.e., the phase difference, which occurs as a result of the application of a voltage is indicated as lightness and darkness or interference colors when viewed through a polarization optical system. A PLZT element has a direct current resistance of $10^{10}$ ohms-centimeters or more, and the electric power required to energize such a PLZT sintered material element is minimal. Moreover, because the electro-optical effect which occurs as a result of an application of an electric field to such an element is displayed as lightness or darkness, or interference colors, through the polarization optical system, a PLZT sintered material is an effective display element utilizing small amounts of power. Accordingly, a display cell formed from such a PLZT sintered material is a passive on equal in display characteristics to cells comprised of liquid crystals. Such display cells may exhibit such contrast ratios between lightness an darkness conditions of 1:100 or more.

In a prior embodiment, the PLZT plate is formed from oxides having extremely high purities of approximately 99.5% or more and particle sizes of $2\mu$ and less. Said oxides consist of PbO, $La_2O_3$, $ZrO_2$ and $TiO_2$ prepared as base materials. Each component element of the compound is provided in proportion to the following formula:

$$PB_{(1-3/2\,x)}La_x(Zr_yTi_z)O_3$$

wherein $x = 0.08$, $y = 0.65$, $z = 0.35$. A mixture of the materials is placed in a ball mill vessel made of polyethylene in which balls of alumina and pure water are added, the ball mill then being rotated for three hours. Following grinding of the composition, the materials are dried in a vacuum, mixed in a mortar, and packed in a white gold crucible. The material is then sintered for two hours at a temperature of 700°C.

Following sintering, the material is pulverized to a fine powder and sifted through a sieve, and then applied to the wet ball mill again using acetone. After mixing is effected by the ball mill, the fine powder is heated and dried at a temperature of 200°C. The fine powder formed thereby is cmpressed by cold pressure into a disc-like shape of about 30mm × 5mm thickness under a pressure of 500 Kg/cm². The disc is then placed in a pressurized heating apparatus and under temperatures of 1,050°C and a pressure of 200 Kg/cm², pressure heated for 20 hours to form a transparent paraelectric PLZT disc.

In the final stage the transparent disc is processed into a display cell, as, for example, for a wrist watch. The transparent sintered disc is first rocessed into a plate having dimensions approximately 5mm × 30mm ×70mm $\mu$ thickness by a process of cutting and polishing. Aluminum is then evaporated on one entire surface of the plate. The upper surface is then divided by electrodes and lead wires are coupled thereto as is hereinafter discussed.

As depicted in FIG. 1, a transparent conductive film is formed on one surface of plate 7 so as to define a seven bar display of the type used to digitally display numerals 0 through 9, each digit being formed by a photo-etching technique. Separate seven bar displays are provided for each digit of time to be displayed such as hours, minutes and seconds. Thus, Nesa film is deposited on top of PLZT plate 7 to form transparent electrodes 4 which electrodes allow an electric field to be applied to the PLZT plate. As is hereinabove discussed, the lower surface of PLZT plate 7 is plated with aluminum film 5 by evaporating the same thereon. The detailed structure of a portion of the upper surface of plate 7 including transparent electrodes 2 is depicted in FIGS. 2 and 3 wherein it is seen that the transparent electrodes are formed so as to be able to apply an electric field in the direction of the thickness of the PLZT plate, and, as depicted in the plan view of FIG. 3, formed to apply an electric field so as to distinguish between a direction parallel with the surface of the PLZT plate and the direction perpendicular to the surface of the plate, i.e., the direction of thickness.

Figure 4:
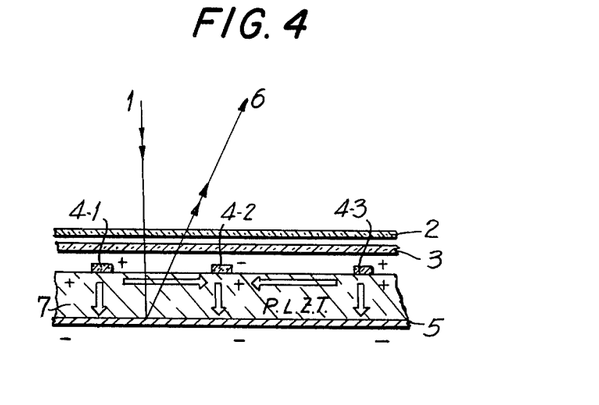
FIG. 4 is a sectional view of a display cell constructed in accordance with the instant invention.

Referring now to FIG. 4, the display cell depicted in FIGS. 1 through 3 is illustrated as an electro-optical display according to a preferred embodiment of the instant invention. The PLZT plate 7 has disposed thereon transparent Nesa film electrodes 4-1, 4-2 and 4-3, and on the under surface thereof is evaporated an aluminum electrode surface 5. Finally, a circular polarized source including a polarizing plate 2 and a ¼ wavelength plate 3 are disposed over the transparent electrodes 4-1 to 4-3 and the PLZT plate 7.

In operation, selective voltages are applied to the Nesa film electrodes 4-1, 4-2 and 4-3 as well as to the evaporated aluminum electrode 5 on the lower surface. The amount of double refraction achieved by the PLZT is effected by selecting the direction of electric polarization of the PLZT element either parallel to or perpendicular to the surface of plate 1. The interference condition of the light 6 that is reflected by the plane aluminum electrode 5 of reflection through the circular polarized source, i.e., polarizing plate 2 and ¼ wavelength plate 3, is changed in accordance with the value of retardation occurring as a result of the selection of the direction of polarization of plate 7, so that a light condition or interference colors are produced on the necessary segment portions to thereby display numeric characters.

In the embodiment hereinabove described, when the retardation effected in the PLZT element is zero, which is when the direction of the electric polarization of PLZT is perpendicular to the surface of the plate, the reflected light 6 is zero or what appears to be a dark condition due to the combination of the circular polarizing plate and the metallic plane of reflection. On the other hand, when the direction of electric polarization is disposed in a parallel direction with respect to the surface of the plate, by applying voltage between electrodes in parallel with the surface of the plate, the light condition obtained is determined according to the amount of electric polarization and at a suitable amount of retardation, a corresponding interference color is achieved. Thus, with such an embodiment, a display can be effected by applying a d.c. voltage in either a parallel or perpendicular direction to the surface of the PLZT plate in response to a control signal such as a timing signal of an electronic watch.

Figure 5:
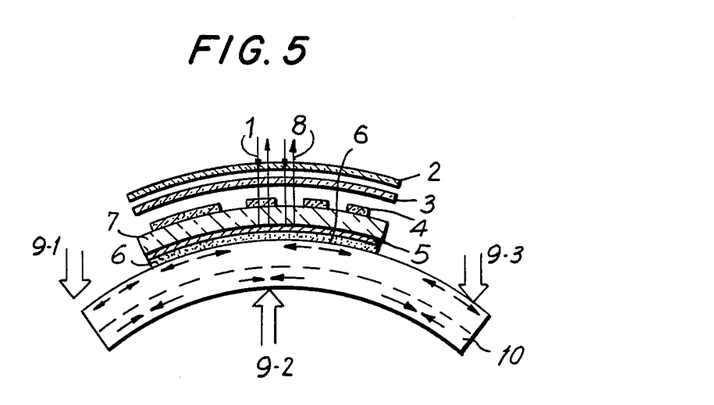
FIG. 5 is a sectional view of a display cell constructed in accordance with another embodiment of the instant invention.

Another embodiment is depicted in FIG. 5, wherein like reference numerals denote like elements. Again, as in the embodiment in FIG. 4 an aluminum metal lyer 5 is evaporated on the whole of one surface of the transparent sintered PLZT plate 7. Similarly, Nesa electrodes 4 are plated on the other surface of the transparent sintered PLZT plate, the plate having been manufactured by substantially the same methods and having substantially the same dimensions as the embodiment of FIG. 1–4. The plate 7 is further adhered along the aluminum evaporated surface thereof by binding agent 6 to an acrylate resin plate 10. The resin plate can have a thickness of approximately 0.5mm but is not so limited.

When positioned in the case of a wrist watch, the display cell is bent as indicated by force arrows 9-1, 9-2 and 9-3, as depicted in FIG. 5, provided with a circular polarizing source and connected with necessary electric circuits. The bending effects a pulling stress illustrated by the arrows on the side of the plate to which the PLZT element is adhered, so that the stress is applied to PLZT element in a direction parallel to the plane thereof. Because of this stress, the electric polarization of the PLZT plate 7 is aligned in the direction of the pulling stress. Thus, when an electric field is not applied in the direction of thickness of the plate most of the electric polarization is in parallel with PLZT plane. Because the PLZT plate is covered with the ¼ wavelength plate 3 and the polarizing plate 2, a polarizing optical system is created wherein the whole surface of the PLZT plate is in a light condition, i.e. retardation exists.

When a d.c. voltage is applied between the Nesa electrodes and the aluminum electrode, to effect an electric field in the thickness direction of the PLZT plate, electric polarization in the portion of the stressed PLZT plate in registration with the Nesa electrode becomes oriented in a direction perpendicular to the surface of PLZT plate, hence reducing retardation so that the portion of the PLZT plate to which the Nesa electrode is attached assumes a dark condition. Thus, dark segment display on a light background is effected.

The required voltage to effect such a display is essentially 25 volts, and the required power is 1 $\mu$W and less. In the embodiment depicted in FIG. 5 as well as those depicted above, because the light is reflected by the metalic film disposed on one side of the PLZT plate, the optical path length on the inner portion of the PLZT plate becomes twice that of the thickness of the plate, the benefit of such construction being the lowering of the required voltage necessarily applied thereto.

Figure 6:
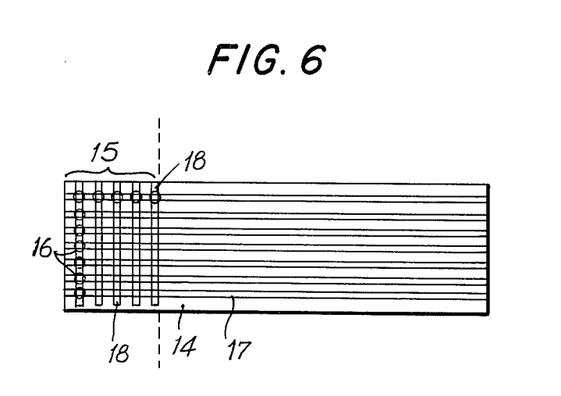
FIG. 6 is a plan view of a display apparatus including the display cell constructed in accordance with the instant invention.

Referring now to FIG. 6, still another electro-optical display is depicted therein utilizing another PLZT compound. The PLZT is formed of:

each component corresponding to the following values, $x = 0.09$, $y = 0.65$, and $z = 0.35$. Utilizing these basic materials, a transparent sintered material is manufactured in the same manner as that explained above. At ambient temperatures such PLZT material has a property of substantial optical isotropy. Accordingly, a secondary electro-optical effect can be utilized.

The PLZT plate is cut into a plate 14 of 8mm × 30mm × 50 $\mu$ thickness and polished. On the plate, transparent electrodes form a display cell wherein one character 15 consists of an array of 5 × 7 dots 16 as is depicted in FIG. 6. Such displays are usually referred to as alpha numeric displays. The transparent electrodes on the upper and lower surfaces are each shaped in the form of a strip, and the upper surface electrodes 17 and the lower surface electrodes 18 being respectively aligned in parallel rows crossed at right angles to each other, the electric field being applied to the PLZT plate at the points of intersection of the projection of the respective upper and lower electrodes.

Figure 7:
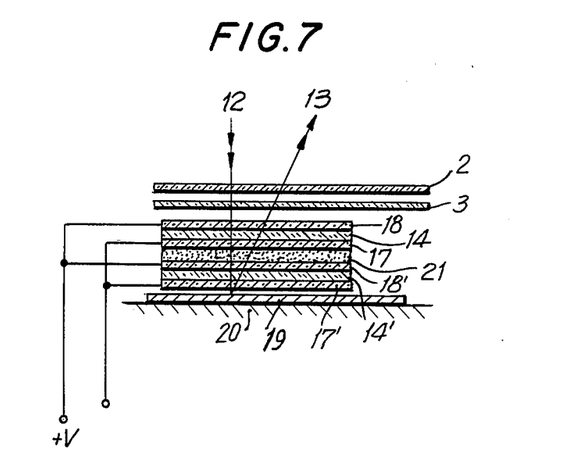
FIG. 7 is a sectional view of still another display cell constructed in accordance with the instant invention.

Turning now to FIG. 7 a display cell is provided using two PLZT plates 14 and 14' having the same structure as depicted in FIG. 6. The display cell is constructed by evaporating a metallic aluminum layer 19 on the base plate 20 over which a PLZT plate 14' is disposed. A transparent insulating film 21 of $SiO_2$ is evaporated on the upper surface of the PLZT plate 14', then another PLZT plate 14 is disposed thereon to form a second layer. As in the display circuits hereinabove described, a ¼ wavelength plate 3 and a linear polarizing plate 2 are disposed in the path of light incident upon the PLZT plates 14 and 14'.

In operation, a first d.c. voltage is applied to the commonly connected electrodes 18 and 18' and a second d.c. voltage is applied to transparent electrodes 17 and 17'. Accordingly high field strength is obtained at extremely low operating voltages. As is understood, when there is no voltage applied thereto, the display device has a retardation of almost zero so that reflected light 13 does not appear when a light source 12 is incident upon such a display. When the voltage is then applied to the display device, retardation is generated in the portions of the PLZT plates in registration with the intersection of the electrodes to which the voltage is applied and an optical effect known as the cross-nicol condition is not satisfied, and reflected light appears. Thus, a white or interference color character on a black background display is achieved. Such display can be clearly observed at an operating voltage of 30 volts and under proper operating conditions such display can be achieved with 10 volts or less.

Figure 8A:
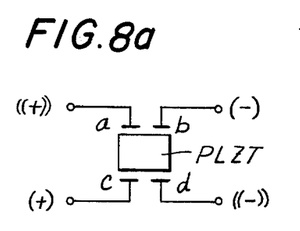
FIGS. 8a and 8b, 9a and 9b are circuit diagrams of the circuitry utilized to energize the display cells constructed in accordance with the instant invention.
Figure 8B:
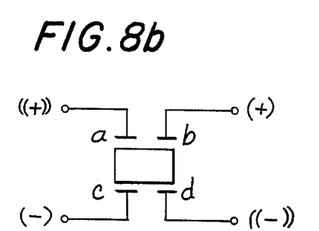

Reference is now made to FIG. 8a wherein the manner in which voltages are applied to a PLZT plate is depicted when such plate is in a "display" state. On the other hand, FIG. 8b shows the manner in which voltages are to be applied if it is desired to "fade out" such a display.

Figure 9A:
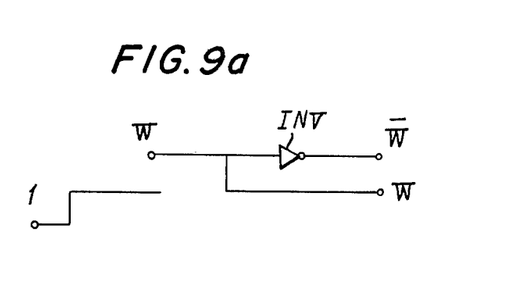
Figure 9B:
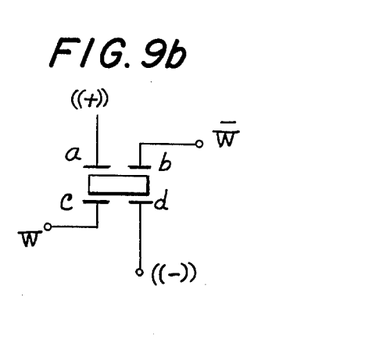

A similar configuration is shown in FIG. 9b, the circuit of FIG. 9b being adapted to be driven by the circuit depicted in FIG. 9a. Specifically, positive and negative electric potentials are always respectively applied to electrodes $a$ and $d$, and either a positive or a negative voltage may be applied to electrode $b$ and $c$ copposite voltages being applied to the latter electrodes. A write-in pulse W and a reverse pulse may be selectively respectively applied to electrodes $b$ and $c$, depending on the polarity of the input signal to the circuit of FIG. 9a. Accordingly, when one stage of the inverter (INV) is used, outputs comprising W and $\overline{W}$ will be applied, it being understood that the electrodes are driven by the circuit shown in FIG. 9a. If the display information is written in when a write-in pulse W is positive, the display will be faded out automatically when the potential is zero. Accordingly, the PLZT element is in a state of either write-in or fade-out, to effect a stable display. Of course, because it is necessary for two lead wires for the $b$ and $c$ electrodes to be provided for each segment, this arrangement provides a complicated structure.

Figure 10A:
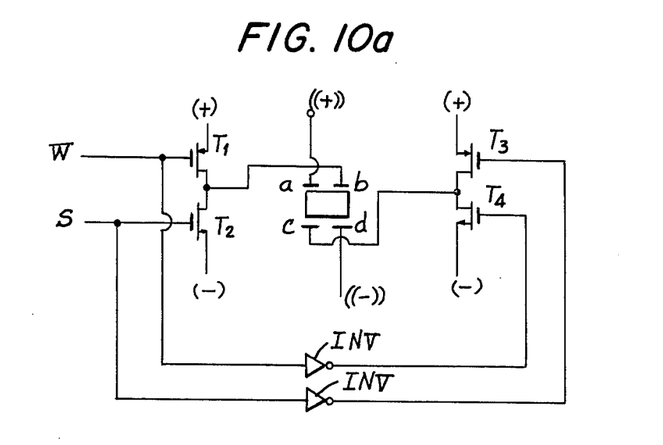
FIGS. 10a and 10b are circuit diagram and wave diagrams respectively of a driving circuit for driving the display cells constructed in accordance with the instant invention.
Figure 10B:
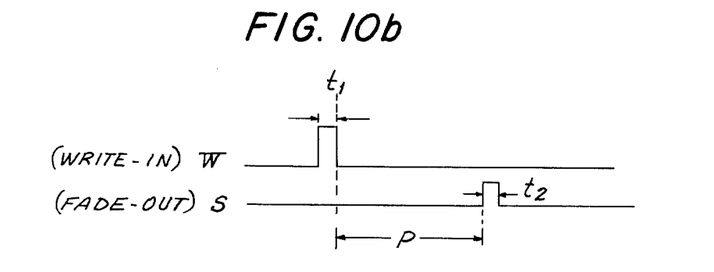

Turning now to FIGS. 10a and 10b a driving circuit and a wave diagram of the signals applied thereto are respectively shown therein. The write-in pulses W have a pulse width $t$, and the display is faded out by fade-out pulses S having a pulse width $t_2$. In the section "P" where there is an absence of any pulses, there is no potential applied to terminals $b$ and $c$ of the PLZT element as shown in the driving circuit of FIG. 10a. $T_1$ and $T_3$ are P-MOS transistors, and $T_2$ and $T_4$ are N-MOS transistors. When $T_1$ and $T_4$ are switched on, $T_2$ and $T_3$ are open, and when $T_2$ and $T_3$ are switched on $T_1$ and $T_4$ are open. In such a case, it is necessary to couple two lead wires from each segment.

Figure 11:
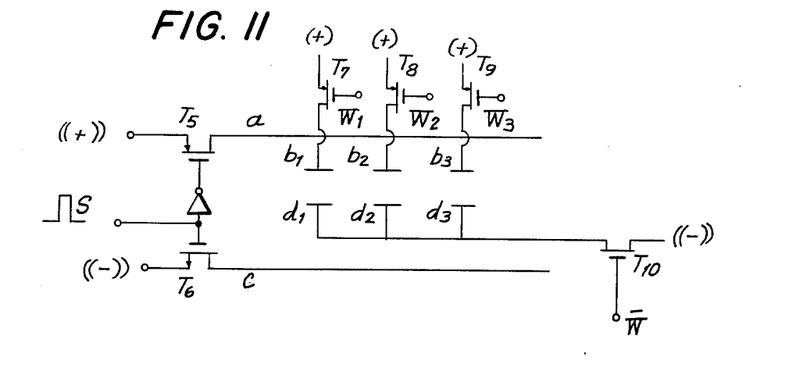
FIG. 11 is a circuit diagram of still another driving circuit for energizing display cells constructed in accordance with the instant invention.

In order to eliminate the necessity of having two lead wires from each segment, the circuit in FIG. 11 is illustrated. MOS transistors $T_5$ and $T_6$ control electrodes a and c in response to the fade-out pulse S. Electrodes $d_1$, $d_2$ and $d_3$ are common to each segment and are connected to MOS transistors $T_{10}$ so as to be controlled by write-in pulses W. Electrodes $b_1$, $b_2$ and $b_3$ are coupled to MOS transistors $T_7$, $T_8$ and $T_9$ to switch write-in pulses $W_1$, $W_2$ and $W_3$. By such an arrangement, writing-in or fading-out is done by the pulse signals, however because the size of the PLZT is required to be large, such structures can be less than satisfactory.

As is shown in FIG. 9 when the electric potential becomes zero, which is at all times other than the write-in time, the fade-out condition is automatically effected. In a wrist watch, where a particular display cell would have a lightened period of one hour or a shortened period of one second during the period, the electric potential of the display cell is distinct so that the strength of the display is not weakened.

It is further noted that in FIG. 10, the capacity for one segment is about 60 picofarads. When pulse driving is utilized, the pulse must be sufficiently large to overcome the low impedance.

Figure 12A:
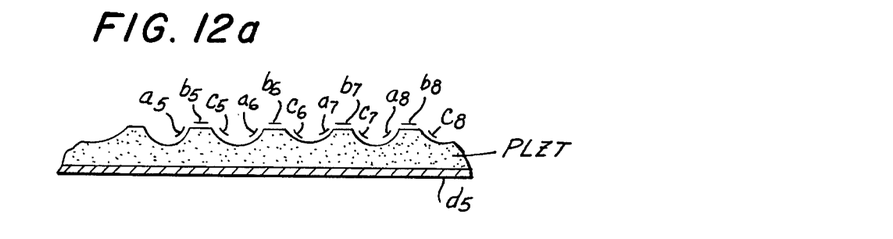
FIGS. 12a and 12b are, respectively, a sectional view of an electro-optical display element and circuit diagram of a driving circuit therefor constructed in accordance with the instant invention.
Figure 12B:
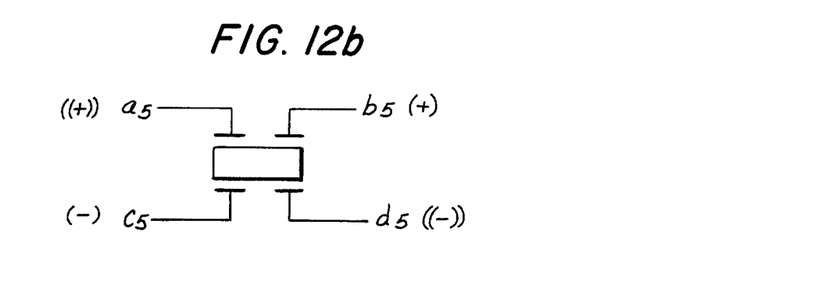

Turning now to FIG. 12a and 12b, a sectional view of a paraelectric PLZT on which mesa etching is performed and a circuit diagram showing the manner in which the voltage must be applied to effect display thereof are respectively depicted. The PLZT plate is mesa etched to form parallel grooves defining a projection therebetween over which Nesa electrodes $a_5$ through $a_8$, $b_5$ through $b_8$ and $c_5$ through $c_8$ are plated thereon, the $a$ and $c$ electrodes being on the side of each projection and the $b$ electrode being on the top thereof. The display is effected by applying voltages between certain electrodes such as $a_5$ and $c_5$ and fade-out is effected by applying a voltage between electrode $b_5$ and electrode $d_5$ corresponding to the aluminum electrode disposed on the opposite side of the PLZT plate discussed in the above embodiments. The direction of applying the voltage between $a_5$ and $c_5$ is at a right angle to the direction of applying the voltage between $b_5$ and $d_5$ so as to obtain the necessary electro-optical display effect.

Figure 13A:
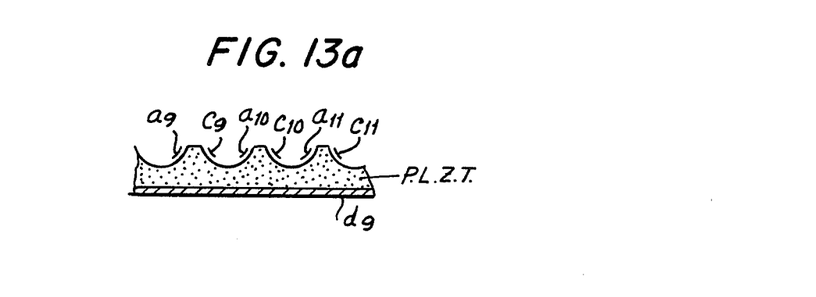
FIGS. 13a and 13b are, respectively, still another sectional view of an electro-optical display element and a circuit diagram of a driving circuit for driving the same constructed in accordance with the instant invention.
Figure 13B:
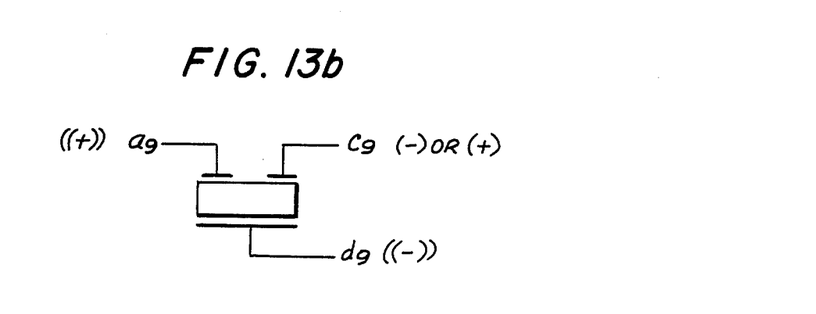

Similarly, a sectional view of another PLZT element and a circuit diagram showing the manner in which PLZT elements are to be energized in order to effect display thereof are respectively illustrated in FIGS. 13a and 13b. As is appreciated, the electrodes $b$ depicted in FIG. 12a have been eliminated by this embodiment. A display is achieved by applying voltages between $a_9$ and $a_{10}$ and the display is faded out by applying a positive voltage at $a_9$ and $c_9$ and applying a negative voltage to the aluminum electrode $d_9$ plated to the bottom surface of the PLZT element. By utilizing such a method, one series of electrodes is eliminated to produce the cost of manufacturing such a display.

As has been described in full, an electro-optical display cell has been provided wherein a transparent sintered PLZT element is combined with a polarizing system to effect a display requiring low power yet yielding high reliability because of its solid state features. It is noted that at ambient temperatures a PLZT element may be in a paraelectric-phase. Such benefits would render such a display cell particularly useful in high precision solid state timepieces such as wrist watches.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electro-optical digital display assembly comprising a transparent ceramic material formed as a plate having a pair of opposed major surfaces, a first major surface of said plate including a first transparent electrode affixed thereto, a second major surface of said plate including a second light reflective electrode affixed thereto, said first transparent electrode being segmented to define selected regions of said ceramic plate therebetween, circular polarization means including a polarization plate overlying said transparent electrode, and circuit means respectively coupled to said first transparent electrode and said second reflective electrode, said circuit means being adapted to selectively apply an electric field to said selective regions defined thereby so that light incident upon said ceramic plate having passed through said polarizing means and through selecting region of said plate is reflected by said reflective electrode in response to the selected application of an electric field to said segmented reflective electrodes at said selected regions, said selected regions remaining opaque to incident light in the absence of electric fields selectively applied thereto.

2. An electro-optical digital display as in claim 1, wherein at least said segmented electrode is formed so that selective energization of groups of segments thereof can selectively define a character to be viewed, and said selective energization means including complementary MOS transistors adapted to apply selective energization signals having a fixed period to said electrode.

3. An electro-optical digital display as recited in claim 1, wherein said polarization means further includes a polarizing plate of a ¼ wavelength.

4. An electro-optical display as recited in claim 1 wherein said plate is formed on at least one surface thereof with a plurality of parallel grooves to define a projection therebetween, said segmented electrodes on said surface including a pair of lineally extending strips positioned on opposed sides of said projection.

5. An electro-optical display as recited in claim 1 including a further transparent electrode segment strip extending along the top surface of each of said projections intermediate said first-mentiond strip segments.

6. An electro-optical digital display as claimed in claim 1, wherein said ceramic plate is bent in the plane of said major surfaces to apply a mechanical stress thereto, said bending of said plate effecting a pulling stress to the region of said first surface.

7. An electro-optical digital display assembly as claimed in claim 1, wherein said ceramic plate is formed of a substantially optically isotropic PLTZ material.

* * * * *